United States Patent Office 3,088,946
Patented May 7, 1963

---

3,083,946
STEROIDAL C–6 ALKINYL OR ALKENYL DERIVATIVES AND PROCESS FOR THE PREPARATION THEREOF
John A. Zderic and Howard J. Ringold, Mexico City, Mexico, assignors, by mesne assignments, to Syntex Corporation, a corporation of Panama
No Drawing. Filed Jan. 19, 1960, Ser. No. 3,277
Claims priority, application Mexico Jan. 20, 1959
33 Claims. (Cl. 260—239.55)

The present invention relates to cyclopentanophenanthrene compounds and to a novel process for the production thereof.

More particularly the invention relates to novel steroid compounds which have an alkinyl or alkenyl substituent at C–6.

The novel compounds of the present invention are valuable hormones as well as valuable intermediates for the production of other valuable steroids as hereinafter described.

The novel compounds of the present invention which are valuable androgenic-type hormones having anabolic, anti-estrogenic and anti-gonadotropic activity may be characterized by the following formulae:

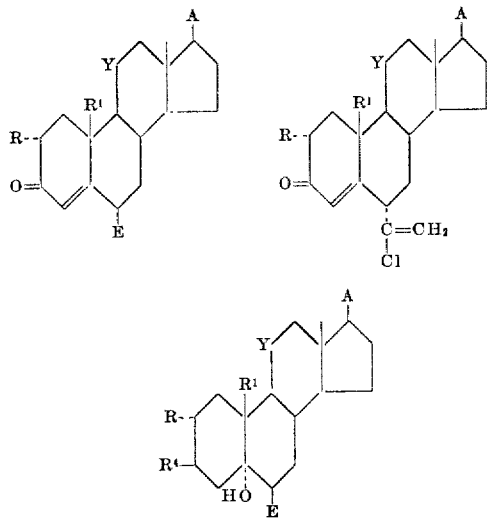

In the above formulae, R represents hydrogen or lower alkyl containing 1 to 5 carbon atoms; $R^1$ represents hydrogen or methyl; A represents β-hydroxy, β-acyloxy, 17α-lower alkyl-17β-hydroxy, 17α-lower alkin(1)yl-17β-hydroxy,17α-lower alken(1)yl-17β-hydroxy; Y represents α-hydroxy, β-hydroxy, keto or hydrogen. E represents β-lower alkinyl and β-lower alkenyl groups containing 1 to 8 carbon atoms and may be of straight, branched, cyclic or mixed straight or branched cyclic and may also be substituted by hydroxy, alkoxy or halogen as chlorine, bromine and fluorine. $R^4$ represents β-hydroxy, keto or cyclic alkylene dioxy. The aforesaid acyl groups are derived from a hydrocarbon carboxylic acid containing from 1 to 12 carbon atoms, saturated or unsaturated, straight chain or branched chain aliphatic, cyclic, cyclic-aliphatic, aromatic and may be substituted by, for example, halogen. Typical ester groups are the formate, acetate, propionate, butyrate, hemisuccinate, enanthate, caproate, benzoate, trimethylacetate, phenoxyacetate, phenylpropionate, cyclopentylpropionate, trifluoroacetate and β-chloropropionate. When A is 17α-lower alkin(1)yl-17β-hydroxy in a $\Delta^4$-3-ketone, the compounds exhibit progestational activity.

The novel compounds of this invention which are also progestational type agents having anti-estrogenic, anti-androgenic and anti-pituitary activity may be characterized by the following formulae:

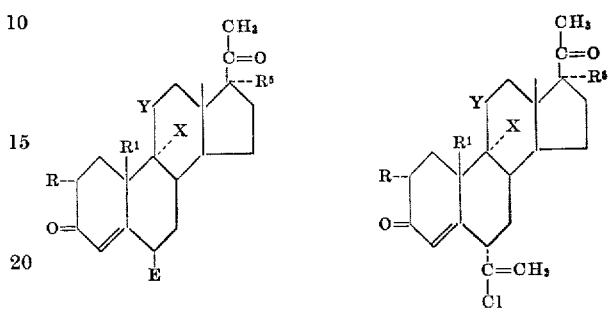

In the above formulae R, $R^1$, Y and E represent the same groups as heretofore set forth; $R^5$ represents hydrogen, hydroxy or ocyloxy, the acyl being derived from a hydrocarbon carboxylic acid containing from 1 to 12 carbon atoms as described hereinabove. X represents hydrogen, chlorine, bromine or fluorine and when Y is hydrogen, X must be hydrogen.

Similarly the novel C–6 substituted derivatives of the diesters of hydrocarbon carboxylic acids of the same type as above stated of Reichstein's Compound "S" exhibit the same biological activity, in addition to being useful intermediates for the preparation of cortical hormones by introducing an oxygen function at C–11 by known means.

The novel compounds of the present invention which exhibit anti-inflammatory, thymolytic and glycogenic activity may be illustrated by the following formulae:

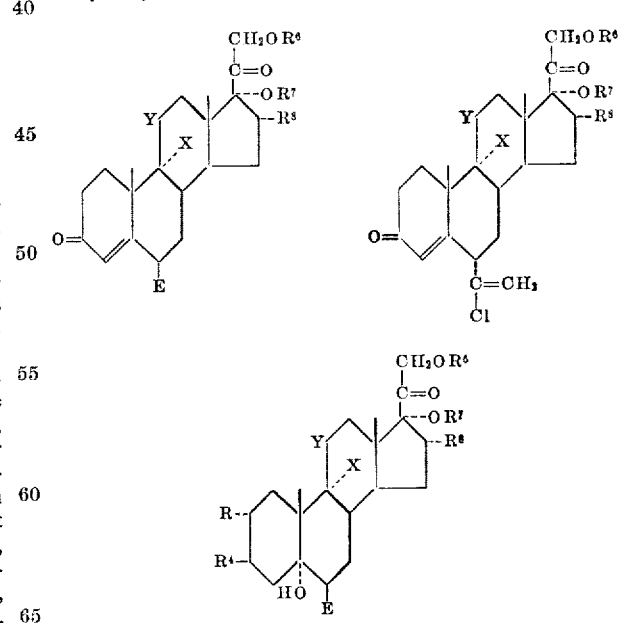

In the above formulae, R, $R^4$, and E have the same meaning as hereinabove set forth. $R^6$ represents hydrogen or acyl; Y represents keto, α-hydroxy or β-hydroxy. X represents hydrogen, chlorine, bromine or fluorine. $R^8$ represents hydrogen, α-methyl or β-methyl. When $R^6$ represents hydrogen, $R^7$ represents hydrogen; when $R^6$ represents acyl, $R^7$ represents hydrogen or acyl. The acyl group in each instance is derived from a hydrocarbon carboxylic acid containing 1 to 12 carbon atoms of the character as heretofore stated.

Certain novel compounds of the present invention are also valuable intermediates for the preparation of 6β-(dihydroxy lower alkylene) derivatives of androstane and pregnane compounds which may be prepared by hydroxylation of the 6β-lower alkenyl, particularly the 6β-vinyl compounds of the present invention with osmium tetroxide.

The preparation of the C-6 substituted cyclopentanopolyhydrophenanthrene compounds which form the subject of the present invention may be illustrated by the following equation, insofar as rings A and B are concerned. When a $\Delta^4$-3-keto compound is used as the starting material; the process proceeds in the following manner:

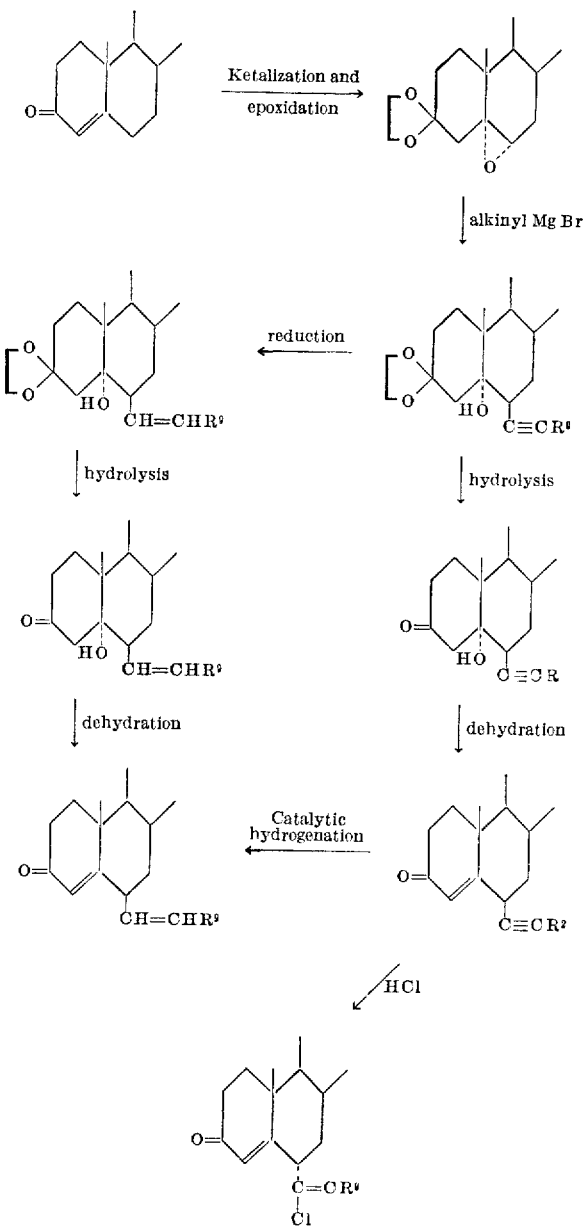

When starting with a 3β-hydroxy compound, the process proceeds in a similar manner, as follows:

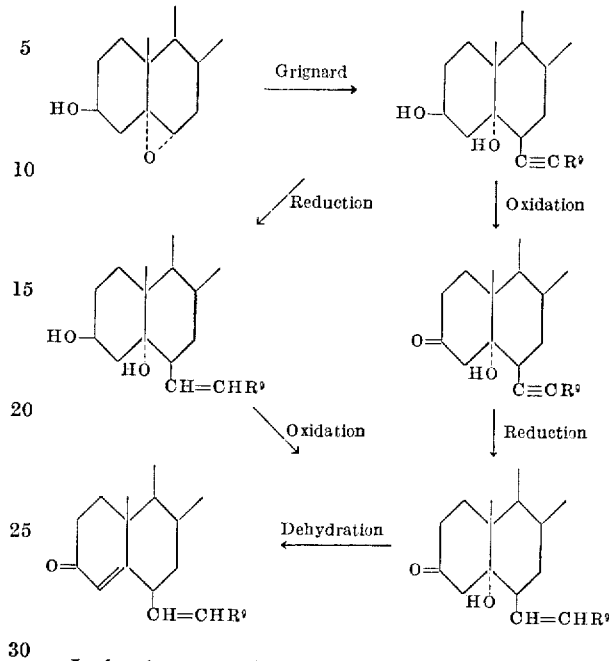

In the above equations, $R^9$ represents hydrogen or lower alkyl.

In practicing the processes above outlined, a 5α,6α-oxido compound of the androstane or pregnane series, substituted at C-3 by hydroxy or 3-cyclic alkylene dioxy, preferably 3-ethylenedioxy, is reacted with an alkinyl Grignard reagent, preferably acetylenic magnesium halide and more particularly ethinyl magnesium bromide under reflux conditions in a solvent such as tetrahydrofurane to form a 6β-ethinyl-5α-hydroxy compound. The latter can then be converted to the 3-keto-6β-ethinyl 5α-hydroxy compound by hydrolysis of the 3-ketal group with an acid such as dilute perchloric acid in tetrahydrofurane, p-toluenesulfonic acid in aqueous acetone, or hydrochloric or sulfuric acid in aqueous lower alkanols, or by oxidation of the 3β-hydroxy group by treatment with an oxidizing agent as for example, chromic acid. The 6β-ethinyl-5α-hydroxy compound substituted at C-3 by keto, β-hydroxy or ethylenedioxy is reduced to the corresponding 6β-vinyl-5α-hydroxy compound either by catalytic hydrogenation in the presence of a hydrogenation catalyst such as palladium on calcium carbonate in a solvent such as pyridine or by the use of lithium in liquid ammonia in the absence of alcohol. Where a 6β,17α-di-ethinyl compound is hydrogenated, reduction of the 17α-ethinyl group to 17α-vinyl is effected at the same time.

Prior to the reduction step, the 3-keto-6β-ethinyl-5α-hydroxy compounds may be dehydrated as by treatment with potassium acetate and methyl alcohol under reflux conditions or with thionyl chloride in pyridine solution at low temperature, to yield the corresponding 6β-ethinyl-$\Delta^4$-3-keto compound, which may then subsequently be reduced to the 6β-vinyl-$\Delta^4$-3-keto derivative. It is also within the scope of the present invention to effect dehydration subsequent to the reduction step.

The alkenyl moiety may also be introduced directly at C-6 by the use of an alkenyl magnesium halide in an inert solvent such as dioxane under reflux conditions, or lower temperatures for a long period of time.

Alternatively the 6β-ethinyl-$\Delta^4$-3-keto compound may be treated with hydrochloric acid which results in the addition of the elements of hydrogen and halogen to the acetylenic bond with simultaneous inversion of the steric configuration at C-6 to form the 6α-(1-chloro-vinyl)-$\Delta^4$-3-keto compound.

The following specific examples serve to illustrate but are not intended to limit the present invention.

Example 1

A stream of acetylene was introduced into a cooled mixture of 250 cc. of 4 N methylmagnesium bromide in ether and 1000 cc. of tetrahydrofurane, for 3 hours and taking care that the temperature did not rise over 10° C.

There were then added 10 g. of 3-ethylenedioxy-5α,6α-oxido-androstan-17β-ol dissolved in 100 cc. of tetrahydrofurane and the mixture was refluxed for 20 hours under an atmosphere of nitrogen. It was then cooled, poured into 5 l. of ice cold aqueous 20% ammonium chloride solution; the product was extracted with several portions of ethyl acetate, the combined extract was washed with water, dried over anhydrous sodium sulfate and the solvent was evaporated. Chromatography of the residue on neutral alumina afforded the pure 6β-ethinyl-3-ethylenedioxy-androstane-5α,17β-diol, M.P. 108–110° C., [α]$_D$ −47 (pyridine).

A solution of 5 g. of the above compound in 100 cc. of acetone was treated with 500 mg. of p-toluenesulfonic acid and kept for 4 hours at room temperature. It was then diluted with water and the precipitate formed was collected by filtration, washed with water, dried, chromatographed on neutral alumina and finally recrystallized from acetone. There was thus obtained 6β-ethinylandrostane-5α,17β-diol-3-one with M.P. 240–245°, raised to 258–260° C. after several recrystallizations, [α]$_D$ −19 (chloroform).

A solution of 1 g. of the above compound in 15 cc. of pyridine was cooled to 0° C. and treated with 1 cc. of thionyl chloride for 8 minutes while cooling in an ice bath. The mixture was poured into 40 cc. of water, the product was extracted with several portions of ethyl acetate and the combined extract was washed with dilute hydrochloric acid and water, dried over anhydrous sodium sulfate and the ethyl acetate was evaporated. The residue was dissolved in acetone, decolorized with charcoal and then purified by repeated recrystallization from acetone, thus affording 6β-ethinyl-testosterone.

A suspension of 900 mg. of 2% palladium on calcium carbonate in 150 cc. of pure pyridine was treated with hydrogen at room temperature for 3 hours to pre-reduce the catalyst. There was then added 3 g. of 6β-ethinyl-testosterone and the mixture was hydrogenated under continuous stirring at room temperature until the absorption of hydrogen practically ceased, which occurred when 1 molar equivalent of hydrogen had been absorbed. The catalyst was removed by filtration washing the filter with a little pyridine and the combined filtrate and washings was evaporated to dryness under reduced pressure. The residue was dissolved in ether, the ether solution was consecutively washed with dilute hydrochloric acid, water, saturated aqueous sodium bicarbonate solution and finally again with water, dried over anhydrous sodium sulfate and the ether was evaporated. Recrystallization of the residue from acetone-hexane yielded 6β-vinyl-testosterone.

The starting material, namely 3-ethylenedioxy-5α,6α-oxido-androstan-17β-ol was obtained by the following method of preparation:

A mixture of 5 g. of testosterone, 300 cc. of anhydrous benzene, 35 cc. of ethyleneglycol and 500 mg. of p-toluenesulfonic acid monohydrate was refluxed for 24 hours, with the use of a water separator for removing the water formed during the reaction; the cooled mixture was treated with 50 cc. of 5% aqueous sodium carbonate solution and 200 cc. of water and the benzene layer was separated, washed with water, dried over anhydrous sodium sulfate, filtered and the benzene was evaporated. By chromatography on neutral alumina there was obtained 3-ethylenedioxy-Δ$^5$-androsten-17β-ol.

To a cooled solution of 5 g. of the above compound in 100 cc. of chloroform was added an ether solution of monoperphthalic acid containing 1.2 molar equivalents of the reagent; the mixture was kept for 12 hours in the dark at room temperature and then diluted with water. The organic phase was separated, washed with water, dried over anhydrous sodium sulfate and the solvent was evaporated. Chromatography of the residue on neutral alumina yielded 3-ethylenedioxy-5α,6α-oxido-androstan-17β-ol.

Example 2

By following the procedure described in Example 1, 5 g. of 17α-methyl-3-ethylenedioxy-5α,6α-oxido-androstan-17β-ol, obtained from 17α-methyl-testosterone by applying the preparation method of Example 1, yielded successively 6β-ethinyl-17α-methyl-3-ethylenedioxy-androstane-5α,17β-diol and 6β-ethinyl-17α-methyl-androstane-5α,17β-diol-3-one.

A solution of 1 g. of the above compound in 30 cc. of methanol was treated with 1 g. of potassium acetate and the mixture was refluxed for 1 hour. It was then cooled, poured into ice water and the formed precipitate collected. Crystallization from methylene chloride-ether gave the pure 6β-ethinyl-17α-methyl-testosterone.

The later compound was hydrogenated in pyridine solution and the using 2% palladium on calcium carbonate as catalyst, in accordance with the hydrogenation method of Example 1, thus affording 6β-vinyl-17α-methyl-testosterone.

Example 3

By following the procedure described in Example 1, 5 g. of 17α-ethinyl-3-ethylenedioxy-5α,6α-oxido-androstan-17b-ol, obtained from 17α-ethinyl-testosterone by applying the preparation method of Example 1, was converted successively into 6β,17α-bis-ethinyl-3-ethylenedioxy-androstane-5α,17β-diol; 6β,17α-bis-ethinyl-androstane-5α,17β-diol-3-one and 6β,17α-bis-ethinyl-testosterone.

A solution of 1 g. of the latter compound in 20 cc. of pyridine was added to a suspension of 500 mg. of 2% palladium on calcium carbonate in 100 cc. of pyridine, that have been previously reduced. The mixture was hydrogenated under continuous stirring at room temperature until 2 molar equivalents of hydrogen were absorbed. The catalyst was removed by filtration and the solution was worked up in accordance with the method described in Example 1. There was thus obtained 6β,17α-di-vinyl-testosterone.

Example 4

By following the procedure described in Example 1, but substituting the ethinylmagnesium bromide for vinylmagnesium bromide, 17α-ethinyl-3-ethylenedioxy-5α,6α-oxido-androstan-17β-ol was converted successively into 6β-vinyl-17α-ethinyl-3-ethylenedioxy - androstane-5α,17β-diol; 6β-vinyl-17α-ethinyl - androstane-5α,17β-diol-3-one and 6β-vinyl-17α-ethinyl-testosterone.

Example 5

5 g. of 3-ethylenedioxy-5α,6α-oxido-9-nor-androstan-17β-ol, obtained from 19-nor-ethinyl-testosterone, by the preparation method described in Example 1, was processed in accordance with the method described also in Example 1, but substituting the stream of acetylene for butine-1, there were thus successively obtained 6β-butin(1)yl-3-ethylenedioxy-19-nor-androstane-5α,17β-diol; 6β-butin(1)yl-19-nor-androstane-5α,17β-diol-3-one and 6β-butin(1)yl-19-nor-testosterone.

Example 6

A solution of 5 g. of 3-ethylenedioxy-5α,6α-oxido-androstan-17β-ol-11-one, obtained from 11-keto-testosterone by the preparation method described in Example 1, in 100 cc. of tetrahydrofurane was treated with ethinylmagnesium bromide, in accordance with the method described in Example 1, and the resulting 6β-ethinyl-3-ethylenedioxy-androstane-5α,17β-diol-11-one was hydrolized with p-toluenesulfonic acid in acetone solution, thus yielding 6β-ethinyl-androstan-5α,17β-diol-11-one.

A mixture of 1 g. of the above compound, 5 cc. of pyridine and 3 cc. of acetic anhydride was kept at room temperature for 4 hours, it was poured into water, the formed precipitate was filtered, washed with water and dried, thus producing the 17-acetate of 6β-ethinyl-androstan-5α,17β-diol-11-one.

The above crude compound was treated with thionyl chloride in pyridine solution, by following the dehydration method of Example 1, to produce the acetate of 6β-ethinyl-11-keto-testosterone.

Hydrogenation of the latter compound in pyridine solution, and using 2% palladium on calcium carbonate as catalyst, in accordance with the method of Example 1, gave the acetate of 6β-vinyl-11-keto-testosterone.

*Example 7*

A solution of 5 g. of 2α,17α-dimethyl-5α,6α-oxido-androstan-17β-ol, obtained from 2α,17α-dimethyl-testosterone by ketalization followed by epoxidation, in accordance with the preparation method of Example 1, was treated with ethinylmagnesium bromide, and the resulting 2α,17α-dimethyl-6β-ethinyl - 3 - ethylenedioxy-androstane, 5α,17β-diol was hydrolyzed with p-toluenesulfonic acid in acetone solution, in accordance with the method described in Example 1 to produce 2α,17α-dimethyl-6β-ethinyl-androstane-5α,17β-diol-3-one.

The above compound was dehydrated with potassium acetate in methanol by following the procedure described in Example 2, thus giving 2α,17α-dimethyl-6β-ethinyl-testosterone.

*Example 8*

In accordance with the hydrogenation method of Example 1, 2 g. of 2α,17α-dimethyl-6β-ethinyl-androstane-5α,17β-diol-3-one, intermediate in the preceding example, was converted into 2α,17α-dimethyl-6β-vinyl-androstane-5α,17β-diol-3-one.

Dehydration of the latter compound with potassium acetate in methanol, by applying the method described in Example 2, gave 2α,17α-dimethyl-6β-vinyl-testosterone.

*Example 9*

10 g. of 5α,6α-oxido-17α-methyl-androstan-3β,17α-diol-3-monoacetate, described by H. J. Ringold et al. in J.O.C., 22, 99 (1957) was treated with ethinylmagnesium bromide, in accordance with the method described in Example 1, to produce 6β-ethinyl-17α-methyl-androstane-3β,5α,17α-triol.

A solution of 3 g. of the above compound in 120 cc. of acetone was cooled to 0° C., flushed with nitrogen and treated with an 8 N solution of chromic acid, under stirring at 0° C. and under an atmosphere of nitrogen until the color of chromium trioxide persisted in the mixture (the 8 N solution of chromic acid had been prepared by dissolving 26.7 g. of chromium trioxide in 23 cc. of concentrated sulfuric acid and diluting with distilled water to 100 cc.). The mixture was stirred for 5 minutes more at 0° C. under an atmosphere of nitrogen, then diluted with ice water and the precipitate was collected, washed with water, dried and recrystallized from acetone-ether, to produce 6β-ethinyl-17α-methyl-androstan-5α,17β-diol-3-one, identical with that obtained in Example 2. Dehydrogenation of the above compound with potassium acetate in methanol, as described in Example 2, gave 6β-ethinyl-17α-methyl-testosterone.

*Example 10*

In accordance with the method of Example 1, 2 g. of 5α,6α-oxido-androstane-3β,17β-diol diacetate, described by Bowers et al. in Tetrahedron 1958, p. 14, was converted into 6β-ethinyl-androstane-3β,5α,17β-triol. Hydrogenation of the above compound in accordance with the method of Example 1, afforded 6β-vinyl-androstan-3β,5α,17β-triol.

*Example 11*

A solution of 5 g. of 3,20-bis-ethylenedioxy-5α,6α-oxido-pregnane obtained from progesterone by the preparation method of Example 1, was treated with ethinylmagnesium bromide in accordance with the method of Example 1, to afford 6β-ethinyl-3,20-bis-ethylenedioxypregnan-5α-ol, M.P. 144–146° C.; [α]$_D$ −35° (chloroform). The ketal groups were then hydrolized with p-toluenesulfonic acid in acetone, to afford 6β-ethinylpregnan-5α-ol-3,20-dione, M.P. 288–290° C. (dec.); [α]$_D$ +51.4° (chloroform). Dehydration of the above compound with thionyl chloride in pyridine gave 6β-ethinyl-progesterone, M.P. 180–184° C.; [α]$_D$ +46° (dioxane).

Hydrogenation of the latter compound in pyridine solution, using 2% palladium on calcium carbonate as catalyst, in accordance with the method of Example 1, gave 6β-vinyl-progesterone.

*Example 12*

By following the procedure described in Example 1, but using 3,20-bis-ethylenedioxy-5α,6α-oxido-pregnan-17α-ol as starting material, obtained from 17α-hydroxy-progesterone by the preparation method described in Example 1, there were obtained successively, 6β-ethinyl-3,20-bis-ethylenedioxy-pregnan-5α,17α-diol, M.P. 210–213° C.; [α]$_D$−48 (chloroform); 6β-ethinyl-pregnan-5α,17α-diol-3,20-dione and 6β-ethinyl-17α-ol-3,20-dione, i.e. 6β-ethinyl-17α-hydroxy-progesterone.

A mixture of 1 g. of the above compound, 40 cc. of acetic acid, 20 cc. of acetic anhydride and 1 g. of p-toluenesulfonic acid was kept at room temperature for 1 hour. The resulting dark solution was poured into ice water and heated on the steam bath for 30 minutes. It was then extracted with ethyl acetate, and the organic extract washed with water, 5% sodium bicarbonate solution and again with water, dried over anhydrous sodium sulfate and evaporated to dryness under reduced pressure. Chromatography of the residue gave 6β-ethinyl-17α-acetoxy-progesterone.

Hydrogenation of the latter compound in accordance with the method described in Example 1, afforded 6β-vinyl-17α-acetoxy-progesterone.

*Example 13*

To a solution of ethylmagnesium bromide, prepared from 3.63 g. of magnesium, 16.3 g. of ethyl bromide and 350 cc. of ether, was added 10.52 g. of ethoxyacetylene dissolved in 175 cc. of ether, under continuous stirring and in the course of 30 minutes. The mixture was stirred for 1 hour further and to the ether solution of ethoxyacetylene bromide thus obtained there was then added a solution of 5 g. of 3,20-bis-ethylenedioxy-5α,6α-oxido-pregnane in 100 cc. of benzene. The mixture was refluxed for 5 hours under an atmosphere of nitrogen, poured into 450 cc. of 20% aqueous ammonium chloride solution and the organic layer was separated, washed with water to neutral, dried over anhydrous sodium sulfate and the solvent was evaporated. By chromatography of the residue on neutral alumina there was obtained 6β-ethoxyethinyl-3,20-bis-ethylenedioxy-pregnan-5α-ol, which was then treated with p-toluenesulfonic acid in acetone solution, in accordance with the method of Example 1, to produce 6β-ethoxyethinyl-pregnan-5α-ol-3,20-dione. Dehydration of the above compound with thionyl chloride in pyridine afforded 6β-ethoxyethinyl-progesterone.

*Example 14*

To 20 cc. of acetic acid containing 1 g. of 6β-ethinyl-progesterone, obtained as described in Example 10, was added 2 cc. of concentrated hydrochloric acid. The reaction mixture was kept at room temperature for 2 hours, water was added and the mixture was extracted with ethyl acetate. The extract was then washed with water, dried over anhydrous sodium sulfate and evaporated to dryness under vacuo. The residue was chromatographed on neutral alumina, the first fractions eluted gave, after recrystallization from ether, 600 mg. of 6α-(1-chloro-vinyl)-progesterone, M.P. 158–161° C.; [α]_D +94° (dioxane) λ_max 240 mμ log ε 4.16.

*Example 15*

By following the procedure described in the previous example, but using 6β-ethinyl-testosterone as starting material, there was obtained 6α-(1-chloro-vinyl)-testosterone.

*Example 16*

In accordance with the method described in Example 1, 5 g. of 3,20-bis-ethylenedioxy-5α,6α-oxido-pregnan-17α,21-diol-21-monoacetate were converted successively into 6β-ethinyl-3,20-bis-ethylenedioxy-5α,17α,21-triol-21-monoacetate; 6β-ethinyl-pregnan-5α,17α,21-triol-3,20-dione-21-monoacetate and 6β-ethinyl-Δ⁴-pregnane-17α,21-diol-3,20-dione.

1 g. of the above compound was acetylated at C–17 with acetic anhydride-acetic acid, in the presence of p-toluenesulfonic acid, in accordance with the method described in Example 9, thus producing 6β-ethinyl-Δ⁴-pregnene-17α,21-diol-3,20-dione diacetate.

The latter compound was hydrogenated by following the procedure of Example 1, thus producing 6β-vinyl-Δ⁴-pregnene-17α,21-diol-3,20-dione diacetate. Treatment of the latter compound with concentrated hydrochloric acid in acetic acid, in accordance with the method of Example 14, gave 6α-(1-chloro-vinyl)-Δ⁴-pregnene-17α, 21-diol-3,20-dione diacetate.

The starting material, namely 3,20-bis-ethylenedioxy-5α,6α-oxido-pregnan-17α,21-diol-21-monoacetate, was obtained from Δ⁴-pregnen-17α,21-diol-3,20-dione by ketalization at C–3 and C–20, acetylation at C–21 and epoxidation of the resulting 5α,6α-oxido-Δ⁵-pregnene-17α, 21-diol-3,20-dione 21-acetate.

*Example 17*

To a solution of 1 g. of sodium metal in 500 cc. of liquid ammonia was added 2 g. of 6β-ethinyl-3,20-bis-ethylenedioxy-pregnan-5α-ol, intermediate in Example 11, dissolved in 20 cc. of tetrahydrofurane. The mixture was stirred for 2 hours, 5 g. of ammonium chloride was then added, the ammonia was allowed to evaporate and the residue was subjected to chromatographic purification on neutral alumina. Recrystallization of the solid fractions from acetone-hexane yielded 6β-vinyl-3,20-bis-ethylenedioxy-pregnan-5α-ol.

Hydrolysis and dehydration of the above compound in accordance with the procedure of Example 11, gave 6β-vinyl-progesterone.

*Example 18*

By following the procedure of Example 11, 5 g. of 5α,6α - oxido - 20 - ethylenedioxy - pregnan - 3β - ol - acetate, obtained from Δ⁵-pregnen-3β-ol-20-one acetate by ketalization at C–20 followed by epoxidation, in accordance with the preparation method of Example 1, were converted successively into 6β-ethinyl-20-ethylenedioxy-pregnane - 3β,5α - diol; 6β - ethinyl - pregnane - 3β,5α-diol-20-one and 6β-vinyl-pregnane-3β,5α-diol-20-one.

In accordance with the preparation method described in Example 1, the following compounds listed under I were converted into the corresponding 5α,6α-oxido-3,20-diethylenedioxy derivatives, which in turn, by following the procedure described in Example 11 gave the 6β-ethinyl-compounds listed under II.

| Example | I | II |
|---|---|---|
| 19 | 19-nor-progesterone | 6β-ethinyl-19-nor-progesterone. |
| 20 | 9α-fluoro-11β-hydroxy-progesterone | 6β-ethinyl-9α-fluoro-11β-hydroxy-progesterone. |
| 21 | 9α-chloro-11-keto-progesterone | 6β-ethinyl-9α-chloro-11-keto-progesterone. |
| 22 | Cortisone | 6β-ethinyl-cortisone. |
| 23 | 16α-methyl-cortisone | 6β-ethinyl-16α-methyl-cortisone. |
| 24 | 11-keto-progesterone | 6β-ethinyl-11-keto-progesterone. |

*Example 25*

By following the hydrogenation method described in Example 1, 6β-ethinyl-16α-methyl-cortisone was converted into 6β-vinyl-16α-methyl-cortisone.

*Example 26*

By following the hydrogenation method described in Example 1, 6β-ethinyl-cortisone was converted into 6β-vinyl-cortisone.

We claim:
1. A compound of the following formula:

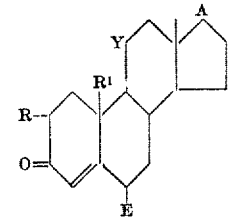

wherein R is selected from the group consisting of hydrogen and lower alkyl; R' is selected from the group consisting of hydrogen and methyl; Y is selected from the group consisting of hydrogen,

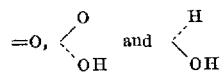

A is selected from the group consisting of

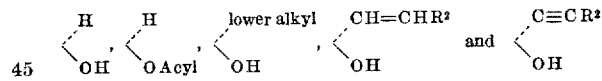

in which R² is selected from the group consisting of hydrogen and lower alkyl, and acyl is derived from a hydrocarbon carboxylic acid containing 1 to 12 carbon atoms; E is selected from the group consisting of —CH=CHR³ and —C≡CR³ wherein R³ is selected from the group consisting of hydrogen, lower alkyl and lower alkoxy.

2. 6β-ethinyl-testosterone.
3. 6β-vinyl-testosterone.
4. 6β-ethinyl-17α-methyl-testosterone.
5. 6β-vinyl-17α-ethinyl-testosterone.
6. A compound of the following formula:

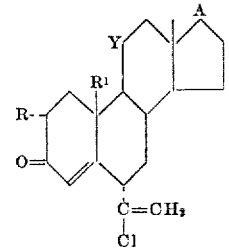

wherein R is selected from the group consisting of hydrogen and lower alkyl; R' is selected from the group consisting of hydrogen and methyl; Y is selected from the group consisting of hydrogen,

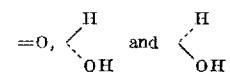

A is selected from the group consisting of

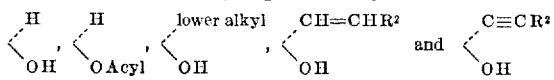

in which R² is selected from the group consisting of hydrogen and lower alkyl, and acyl is derived from a hydrocarbon carboxylic acid containing 1 to 12 carbon atoms.

7. A compound of the following formula:

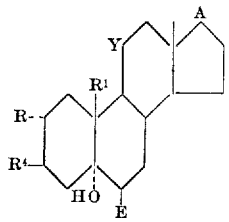

wherein R is selected from the group consisting of hydrogen and lower alkyl; R' is selected from the group consisting of hydrogen and methyl; Y is selected from the group consisting of hydrogen,

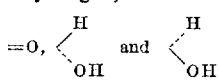

A is selected from the group consisting of

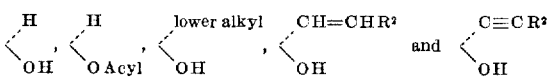

in which R² is selected from the group consisting of hydrogen and lower alkyl, and acyl is derived from a hydrocarbon carboxylic acid containing 1 to 12 carbon atoms; E is selected from the group consisting of —CH=CHR³ and —C≡CR³ wherein R³ is selected from the group consisting of hydrogen, lower alkyl and lower alkoxy; R⁴ is selected from the group consisting of β-hydroxy, keto, and lower alkylenedioxy.

8. 6β-ethinyl-androstane-3β,5α,17β-triol.

9. 6β - ethinyl - 17α - methyl - androstane - 5α,17β-diol-3-one.

10. 6β,17α - diethinyl - androstane - 5α,17β - diol - 3-one.

11. A compound of the following formula:

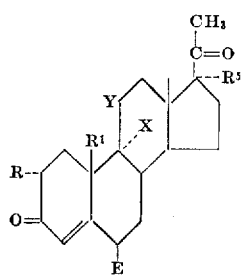

wherein R is selected from the group consisting of hydrogen and lower alkyl; R' is methyl; Y is selected from the group consisting of hydrogen,

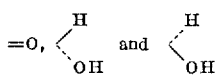

X is selected from the group consisting of hydrogen, chlorine, bromine and fluorine and when Y is hydrogen, X is hydrogen; E is selected from the group consisting of —CH=CHR³ and —C≡CR³ wherein R³ is selected from the group consisting of hydrogen, lower alkyl and lower alkoxy; and R⁵ is selected from the group consisting of hydrogen, hydroxy and acyloxy derived from a hydrocarbon carboxylic acid containing from 1 to 12 carbon atoms.

12. 6β-ethinyl-progesterone.
13. 6β-vinvyl-progesterone.
14. 6β-ethoxyethinyl-progresterone.
15. 6β-ethinyl-17α-acetoxy-progesterone.
16. 6β-vinyl-17α-acetoxy-progesterone.
17. 6β-ethinyl-9α-fluoro-11β-hydroxy-progesterone.
18. A compound of the following formula:

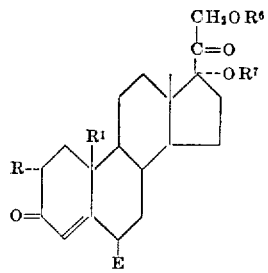

wherein R is lower alkyl; R' is selected from the group consisting of hydrogen and methyl; R⁶ and R⁷ are each selected from the group consisting of hydrogen and the acyl radical of a hydrocarbon carboxylic acid containing from 1 to 12 carbon atoms and E is selected from the group consisting of —CH=CHR³ and —C≡CR³ wherein R³ is selected from the group consisting of hydrogen, lower alkyl and lower alkoxy.

19. A compound of the following formula:

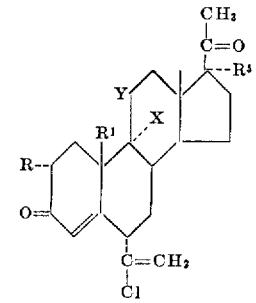

wherein R is selected from the group consisting of hydrogen and lower alkyl; R' is methyl; Y is selected from the group consisting of hydrogen,

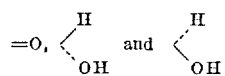

X is selected from the group consisting of hydrogen, chlorine, bromine and fluorine, and when Y is hydrogen, X is hydrogen and R⁵ is selected from the group consisting of hydrogen, hydroxy and hyrocarbon carboxylic acyl containing from 1 to 12 carbon atoms.

20. 6α-(1)-chlorovinyl-progesterone.
21. A compound of the following formula:

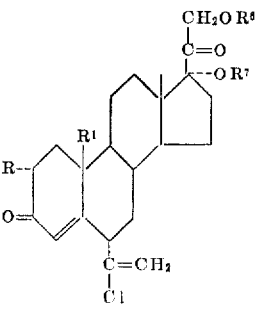

wherein R is selected from the group consisting of hydrogen and lower alkyl; R' is methyl; and R⁶ and R⁷ are each selected from the group consisting of hydrogen and the acyl radical of a hydrocarbon carboxylic acid containing from 1 to 12 carbon atoms.

22. A compound of the following formula:

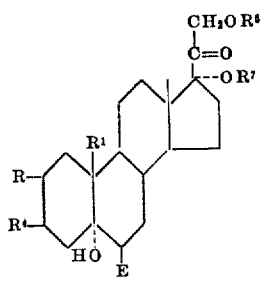

wherein R is selected from the group consisting of hydrogen and lower alkyl; R' is methyl; E is selected from the group consisting of —CH=CHR³ and —C≡CR³ wherein R³ is selected from the group consisting of hydrogen, lower alkyl and lower alkoxy; R² and R³ are each selected from the group consisting of hydrogen and the acyl radical of a hydrocarbon carboxylic acid containing from 1 to 12 carbon atoms; R⁴ is selected from the group consisting of β-hydroxy, keto and lower alkylenedioxy.

23. 6β-ethinyl-pregnane-5α-ol-3,20-dione.
24. 6β-ethinyl-3,20-bis-ethylenedioxy-pregnane-5α-ol.
25. 6β-vinyl-pregnane-5α-ol-3,20-dione.
26. A compound of the following formula:

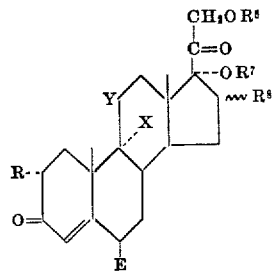

wherein R is selected from the group consisting of hydrogen and lower alkyl; E is selected from the group consisting of —CH=CHR³ and —C≡CR³ wherein R³ is selected from the group consisting of hydrogen, lower alkyl and lower alkoxy; Y is selected from the group consisting of keto, β-hydroxy and α-hydroxy; X is selected from the group consisting of hydrogen, chlorine, bromine and fluorine; R⁶ and R⁷ are each selected from the group consisting of hydrogen and a hydrocarbon carboxylic acyl group containing from 1 to 12 carbon atoms and R⁸ is selected from the group consisting of hydrogen, α-methyl and β-methyl.

27. 6β-ethinyl-16β-methyl-cortisone.
28. 6β-ethinyl-cortisone.
29. 6β-vinyl-cortisone.
30. 6β-vinyl-16β-methyl-cortisone.

31. A compound of the following formula:

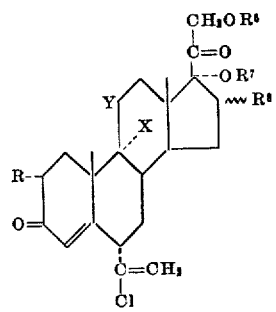

wherein R is selected from the group consisting of hydrogen and lower alkyl; Y is selected from the group consisting of keto, β-hydroxy and α-hydroxy; X is selected from the group consisting of hydrogen, chlorine, bromine and fluorine; R⁶ and R⁷ are each selected from the group consisting of hydrogen and a hydrocarbon carboxylic acyl group containing from 1 to 12 carbon atoms; R⁸ is selected from the group consisting of hydrogen, α-methyl and β-methyl.

32. A compound of the following formula:

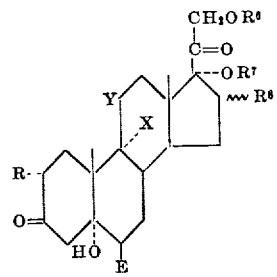

wherein R is selected from the group consisting of hydrogen and lower alkyl; E is selected from the group consisting of —CH=CHR³ and —C≡CR³ wherein R³ is selected from the group consisting of hydrogen, lower alkyl and lower alkoxy; Y is selected from the group consisting of keto, β-hydroxy, α-hydroxy and α-hydrocarbon carboxylic acyloxy containing from 1 to 12 carbon atoms; X is selected from the group consisting of hydrogen, chlorine, bromine and fluorine; R⁶ and R⁷ are selected from the group consisting of hydrogen and a hydrocarbon carboxylic acyl group containing from 1 to 12 carbon atoms; R⁸ is selected from the group consisting of hydrogen, α-methyl and β-methyl.

33. A process for the production of 6β-lower alkinyl-Δ⁴-3-keto steroids selected from the class consisting of the androstane series and the pregnane series which comprises reacting a compound selected from the group consisting of a 5α,6α-oxido-androstane and a 5α,6α-oxido-pregnane having an alkylenedioxy substituent at C–3 with an alkinyl magnesium halide in an inert solvent, hydrolyzing the thus formed 3-alkylenedioxy-5α-hydroxy-6β-alkinyl-steroid with an acid to obtain the corresponding 3-keto-5α-hydroxy-6β-alkinyl-steroid and treating with a dehydrating agent to obtain the corresponding 6β-alkinyl-Δ⁴-3-keto-steroid.

References Cited in the file of this patent

Burn et al.: "Journal Chem. Soc.," December 1959, pages 3808–3811.

Ellis: "Journal Chem. Soc.," June 1960, pages 2596–2602.

UNITED STATES PATENT OFFICE
CERTIFICATE OF CORRECTION

Patent No. 3,088,946            May 7, 1963

John A. Zderic et al.

It is hereby certified that error appears in the above numbered patent requiring correction and that the said Letters Patent should read as corrected below.

Column 10, lines 38 to 41 should appear as shown below instead of as in the patent:

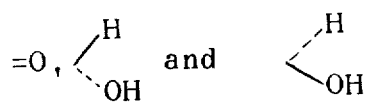

Signed and sealed this 19th day of November 1963.

(SEAL)
Attest:
ERNEST W. SWIDER

Attesting Officer

EDWIN L. REYNOLDS

Acting Commissioner of Patents